United States Patent

Kornreich et al.

[11] Patent Number: 6,072,930
[45] Date of Patent: Jun. 6, 2000

[54] METHOD OF FABRICATING A CYLINDRICAL OPTICAL FIBER CONTAINING A PARTICULATE OPTICALLY ACTIVE FILM

[75] Inventors: Philipp G. Kornreich, N. Syracuse; James Flattery, Syracuse; Douglas V. Keller, Jr., Lafayette, all of N.Y.

[73] Assignee: Syracuse University, Syracuse, N.Y.

[21] Appl. No.: 09/186,309

[22] Filed: Nov. 4, 1998

[51] Int. Cl.[7] ........................................... G02B 6/02
[52] U.S. Cl. .............................................. 385/123
[58] Field of Search ................... 385/123–126, 385/129–132, 147; 65/410, 398, 403, 421, 422, 419, 110, DIG. 16, 412, 413; 428/422, 35.7, 463

[56] References Cited

U.S. PATENT DOCUMENTS

| | | |
|---|---|---|
| 3,754,879 | 8/1973 | Phaneuf . |
| 3,971,645 | 7/1976 | Bachmann et al. . |
| 4,179,189 | 12/1979 | Kaminow et al. . |
| 4,229,197 | 10/1980 | Streng . |
| 4,264,347 | 4/1981 | Shintani et al. . |
| 4,360,371 | 11/1982 | Blakenship et al. ................ 65/403 |
| 4,453,961 | 6/1984 | Berkey ................................ 65/419 |
| 4,486,212 | 12/1984 | Berkey ................................ 65/421 |
| 4,561,871 | 12/1985 | Berkey ................................ 65/421 |
| 4,596,589 | 6/1986 | Perry . |
| 4,678,274 | 7/1987 | Fuller . |
| 4,749,396 | 6/1988 | Hicks, Jr. . |
| 4,784,465 | 11/1988 | Berkey ............................. 428/542.8 |
| 4,869,743 | 9/1989 | Fitoussi et al. . |
| 4,871,383 | 10/1989 | Bachmann et al. . |
| 5,079,433 | 1/1992 | Smith . |
| 5,093,880 | 3/1992 | Matsuda et al. . |
| 5,316,562 | 5/1994 | Smithgall et al. . |
| 5,578,106 | 11/1996 | Fleming, Jr. et al. . |

*Primary Examiner*—Akm E. Ullah
*Attorney, Agent, or Firm*—Wall Marjama Bilinski & Burr

[57] ABSTRACT

A method of forming a preform which has a glass core surrounded by an outer glass cladding with a coating of an particulate optically active material disposed between the core and cladding. The method includes providing a glass core having a viscosity which lies within a given preselected temperature range, followed by forming a coherent coating of an optically active particulate material over the surface of the core, with the coating material having a viscosity which is equal to or less than the viscosity of the glass core. A glass cladding is formed over the coated layer, with the cladding glass having a viscosity which overlaps the viscosity of the core glass. The optically active material is an inorganic material which includes a metal, metal alloy, ferrite, magnetic material and a semiconductor. The invention includes the product formed by the process.

11 Claims, 3 Drawing Sheets

METHOD OF FABRICATING A CYLINDRICAL OPTICAL FIBER CONTAINING A PARTICULATE OPTICALLY ACTIVE FILM

This invention was made with government support under Grant No. F30602-96-C-0172 from the United States Air Force. Rome Laboratories. The government has certain rights in this invention.

FIELD OF THE INVENTION

This invention relates generally to a method of fabricating optical fibers, and more specifically to a method of fabricating optical fibers with a coating of an optically active material interposed between the cladding and core of the optical fiber.

BACKGROUND ART

The technology of fiber optics is constantly changing. These technologies proliferate many technological areas including communications systems, sensors semiconductors, and laser technologies. Newly emerging areas employ fiber optics in a variety of ways. For example, fiber light amplifiers for fiber optic communications, fiber lasers for CD ROM applications, nonlinear fibers for optical switches, and fiber stress sensors in structure represent just a few of the applications of fiber optics.

Related art describes the fabrication of fibers which consist of a glass core covered with a glass tube to form the cladding that acts as a shield. The core serves to guide the light. Related art also describes coating the glass core with a film which is interposed between the glass core and the glass tube. The coatings used to produce the films can include various inorganic materials such as semiconductors, metals, alloys, magnetic materials, ferrites and ceramics. These films can be employed for a variety of purposes, considering the fact that properties of light traveling in the core can be modified by the presence of a specific coating. The related prior art however, fails to teach exactly how these fibers are to be fabricated when employing a wide variety of coating materials.

The fabrication of the fibers begins with the manufacture of a "preform". The "preform" is constructed by placing a micrometer or less coating on a glass rod which eventually becomes the core of the optical fiber. The coated rod is then placed inside of a larger diameter glass tube. In one case the glass tube is then sealed at one end in a vacuum in the space between the coated rod and the tube. This assembly is then heated which causes the glass of the outer tube to collapse onto the coated rod. Additional glass tubes are collapsed on to this structure until the desired outside diameter of the preform is reached. This assembly is the "preform". Once the "preform" is constructed, it is then heated to a softening temperature of the glass, and fibers are drawn from the "preform". However, since the films are relatively thin, typically 10 nanometers or less, difficulty often arises when the fibers are drawn from the "preform" as the films tend to fracture and loose their continuity. The related prior art does not teach a reliable method of fabricating fibers which ensures that the continuity of the film layer is maintained as the fibers are drawn from the "preform". That is, the resulting film material only covers portions of the fiber due to breaks in the material. Moreover, the related art also fails to discuss a method for ensuring that the film layer will remain coherent and homogeneous during the drawning step.

In view of the above, there is a need in the art for a method of fabrication which ensures that the film layer maintains coherency, continuity and homogeneity as fibers are drawn from the "preform".

SUMMARY OF THE INVENTION

Accordingly, it is a primary object of the present invention to provide a fabrication method for optical fibers that includes an optically active particulate film on the core of the fiber, which ensures continuity of the film along the length of the fiber.

Still another object of the present invention is to provide a fabrication method which employs the use of optically active particulate coatings which adhere homogeneously to the glass rod during the "preform" construction.

Still another object of the present invention is to provide a fabrication method which employs the use of optically active particulate coatings, such as metals, non-metals, alloys, magnetic materials, semi-conductors, and other inorganic materials which do not vaporize or decompose when heated to the flow point temperature of the glass.

Still another object of the present invention is to provide a fabrication method which employs the use of optically active particulate films which flow continuously and homogeneously at the glass rod/glass core interface during the fiber drawing process.

Yet another object of the present invention is to provide a fabrication method which employs the use of optically active particulate coatings which will form a coherent, continuous film upon completion of the fiber drawing process.

Still another object of the present invention is to provide a fabrication method which results in an optical fiber with a particulate film layer, located between the glass core and the glass shield, which modifies the properties of light traveling in the core.

Another object of the present invention is to provide a fabrication method which employs the use of optically active particulate coatings in which the viscosity of the particular coating is less than the viscosity of the particular glass at the glass flow point temperature thereby allowing the coating to flow during the fiber drawing process.

Another object of the present invention is to provide a fabrication method which allows a partial coating of the core with a film layer. In some applications, it is desired to have only a small fraction of the core covered with an optically active film, yet that partial coating must be continuous along the optical fiber.

Another object of this present invention is to provide a fabrication method where the glass cladding and glass core are of a different composition.

Another object of the present invention is to provide a secondary inorganic coating over the optically coated "preform" core. The object is to prevent a low melting point coating material from dewetting the core at the "preform" collapse temperature.

These and other objects are accomplished by the method and resulting product of the present invention. The present invention is based upon the observations that during the fiber pulling process, the pressure in the glass can vary by a factor of several thousand from the point where the preform starts to the narrow to the point where the fiber diameter is reached. The glass core for the present invention is selected such that its flow range lies within a preselected temperature range. Although the flow range depends upon the type of glass, it generally lies between about 600° C. and 1500° C. The glass core material can be selected from any suitable glass, depending upon the application of the fiber that is produced. For example suitable glasses include, Pyrex, pure fused silica, and aluminosilicate glasses. Therefore the core glass should have a larger index of refraction than the cladding glass. Both the core and cladding glasses should have compatible expansion coefficients. It is necessary for the fibers to have cores through which only a single mode propagates. The diameter of the preform glass core can also vary depending upon the application; however, they typically have an outside diameter of about 0.1 cm.

The particulate coating is formed over the surface of the core, and eventually forms the film. The coating materials serves to modify the properties of the light traveling in the core. An appropriate coating material must remain uniform and continuous when drawn into the fiber, despite the fact that the film must be relatively thin. For instance, most films in the finished fiber have a thickness of about 10 nanometers or less. Consequently, the material selected for the coating must have a flow point which lies within the flow range for the glass. That is, the flow properties of the specific coating selected must match the viscosity of the glass at the flow point temperature of the glass core material. To accomplish this, the optical material of the film is chosen which has a flow property less than the core and cladding glass at the "preform" collapsing temperature and the fiber drawing temperature. Moreover, the coating material must be one that does not break down chemically, vaporize or adversely react when it comes into contact with the glass at this fabrication temperature.

The coating material can be any suitable particulate inorganic material such as either an alloy, a metal, non-metal, ceramic, ferrite, magnetic materials or semiconductor material, and can be any species of one of those genuses. These coating materials should have flow properties less than the viscosity of the core/cladding glass at the softening point of glass, and be capable of modifying the properties of light traveling in the core. The resulting film serves as an interface between the core and the outer glass cladding. The film is substantially uniform over the entire surface of the glass core.

The glass cladding is formed over the interfacial film layer. The glass cladding material can be selected from any suitable glass as well, such as those used for the core, depending upon the application of the fiber that is produced; however, the glass cladding must have a flow range which overlaps the flow range of the glass core material. Usually the core glass has a higher index of refraction than the cladding glass.

Three suitable pairings of core/cladding glass combinations which can be used in the present invention and their respective properties are tabulated below.

TABLE

| Type of Glass | Type | Thermal Expansion Coeff. | Softening point C. | Refractive Index |
| --- | --- | --- | --- | --- |
| Example 1 | | | | |
| Core Rod Glass Code 7056 | Borosilicate | 5.15E-06 | 702 | 1.487 |
| Cladding Glass Code 7052 | Borosilicate | 4.60E-06 | 708 | 1.484 |
| Example 2 | | | | |
| Core Rod Glass Code 7251 | Borosilicate | 3.67E-06 | 780 | 1.476 |
| Cladding Glass Code 7760 | Borosilicate | 3.40E-06 | 780 | 1.473 |
| Example 3 | | | | |
| Core Rod Glass Code 7052 | Borosilicate | 4.60E-06 | 712 | 1.484 |
| Cladding Glass Code 7040 | Borosilicate | 4.75E-06 | 702 | 1.480 |

All of the above glasses are available from Corning under their respective code number listed in the table.

BRIEF DESCRIPTION OF THE DRAWING

For a fuller understanding of the nature and objects of the invention, reference should be made to the following detailed description of a preferred mode of practicing the invention, read in connection with the accompanying drawings, in which.

DETAILED DESCRIPTION OF THE INVENTION

To achieve the foregoing and other objectives, a method of fabricating a "preform" according to the present invention is as follows. The method of fabrication results in a "preform" which consists of a glass core, a particulate coating which eventually forms a thin film on the glass core, and a glass cladding which surrounds both the film and the core. This glass cladding acts as a shield, whereas the coated glass core serves to guide the light. The film serves to modify the properties of the light traveling within the core. The fibers are drawn from this "preform". A typical optical fiber has an outside diameter of about 125 micrometers, while the outside diameter of the core is about 10 micrometers. Depending up the application, the core size may vary widely. In some applications, the outside diameter of the core may be up to about 2 mm.

Figure 1:
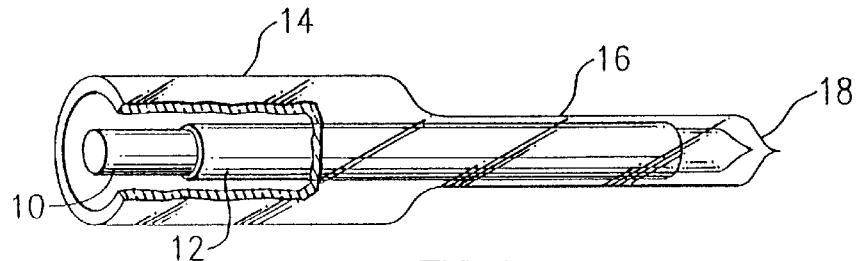
FIG. 1 is a partially broken away perspective view illustrating a method for forming a preform of the present invention.

In one embodiment, the preform can be made by forming a coating of particulate material 12 over a core rod 10 as illustrated in FIG. 1. The coated core rod is then inserted into a glass tube 14 that has been cleaned, closed at one end 18, and evacuated. The tube is then collapsed unto the coated core rod as shown at 16 in the drawing.

Importantly, the particulate coating selected must have a flow point which lies within the flow range for the glass. The coating material must be one that does not break down, vaporize or react when it comes into contact with the glass. These properties allow the film to flow smoothly as fibers are pulled from the "preform". It should also be noted that the particulate coating must adhere well to the glass since it must remain in place homogeneously throughout the preform construction. Many coating materials, have these characteristics, as well as the capability of modifying the properties of light traveling in the core. In this particular case the coating is particulate in nature, and could be selected from a variety of suitable materials. For example, inorganic oxides, sulfides, ferrites and selenides can be suitable coating materials.

Figure 2:
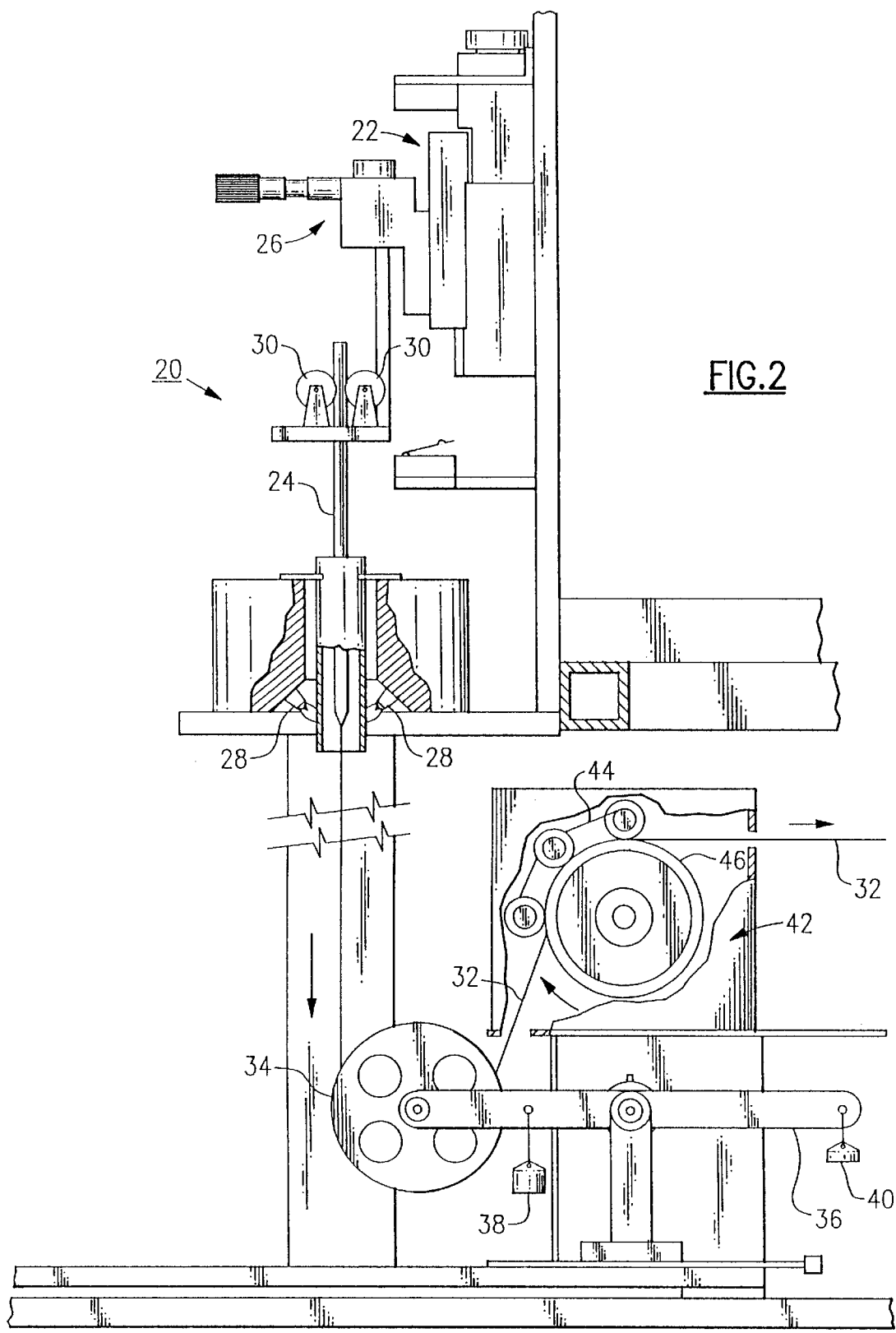
FIG. 2 is a side elevational view of a conventional drawing tower suitable for drawing a fiber made according to the present invention.

The fiber is drawn from the preform by any conventional fiber drawing tower apparatus known to the art. FIG. 2 illustrates a fiber drawing tower 20 suitable for use in making fibers of the present invention.

The top of the fiber drawing tower includes a motorized translation stage 22 which lowers the preform 24 at a rate of about 50 $\mu$m per sec. The horizontal position of the preform can be adjusted with an x-y translation stage 26 to align it with the center of the burner 28. The preform is held by a centering chuck 30. The burner heats the preform so that a fiber 32 can be drawn from it.

The fiber is drawn to the bottom of the fiber drawing tower emerging from the burner 28 and passes over pulley 34 that is mounted on a lever arm 36. A weight 38 provides the required tension for the fiber and preform during the drawing process so that the core and cladding glass of the preform will smoothly extrude the optically active material layer. There is a counterbalancing weight 40 at the opposite end of the lever arm to balance the weight of the pulley. The capstan 42 pulls the fiber 32 between a belt 44 and stainless steel wheel 46.

Figure 3:
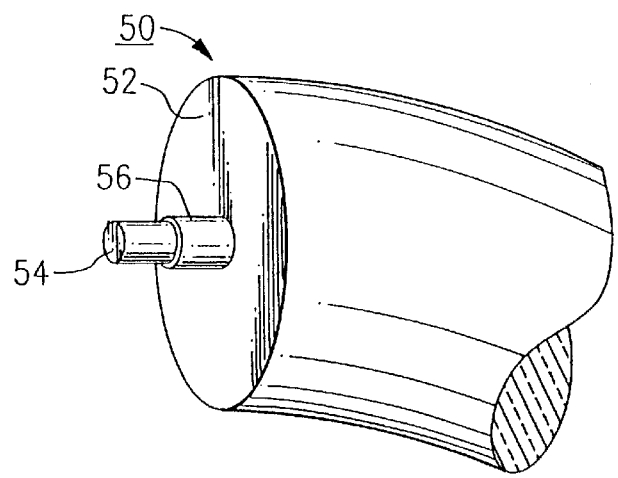
FIG. 3 is a perspective view of a section of a fiber of the present invention.

A perspective view of a fiber made by the present invention is illustrated in FIG. 3 in which the fiber 50 contains an outer glass cladding 52 and an inner glass core 54 which contains an outer film 56 which comprises a particulate optically active material.

The light transported through the core of a fiber optic fiber is modified by the nature of the core/cladding interface. The material characteristics of the core coating modifies the light transported. Ideally, the core/cladding interface should be infinitely planer and cylindrical. Thus, when the core coating is of a particulate material, which is located at the core/cladding interface in the finished product fiber, the smaller the particle size of the coating material, the less the particulate mechanical interference with the light transport. Therefore, coating particles smaller than 50 nanometers are desired. Numerous chemical procedures have been identified in the literature (for example, T. Ishikawa and E. Matijevic, "Formation of Monodispersed Pure and Coated Spindle-Type Iron Particles", Langmuir, 4, 26–31 (1998)) to produce such particles from metals, oxides, sulfides, selenides and tellurides. This reference is incorporated herein by reference.

In one embodiment, carbon black has been found to be a suitable coating material. Importantly, it should be noted that the fiber only guides the light, where the carbon particles interact with the light. In this case in the UV band.

The resulting film serves as an interface between the core and the glass tube, with the film being substantially uniform over the entire surface of the glass core.

The fabrication of an optical fiber having a carbon nanoparticle film surrounding the core is made by the following process.

EXAMPLE

Figure 4:
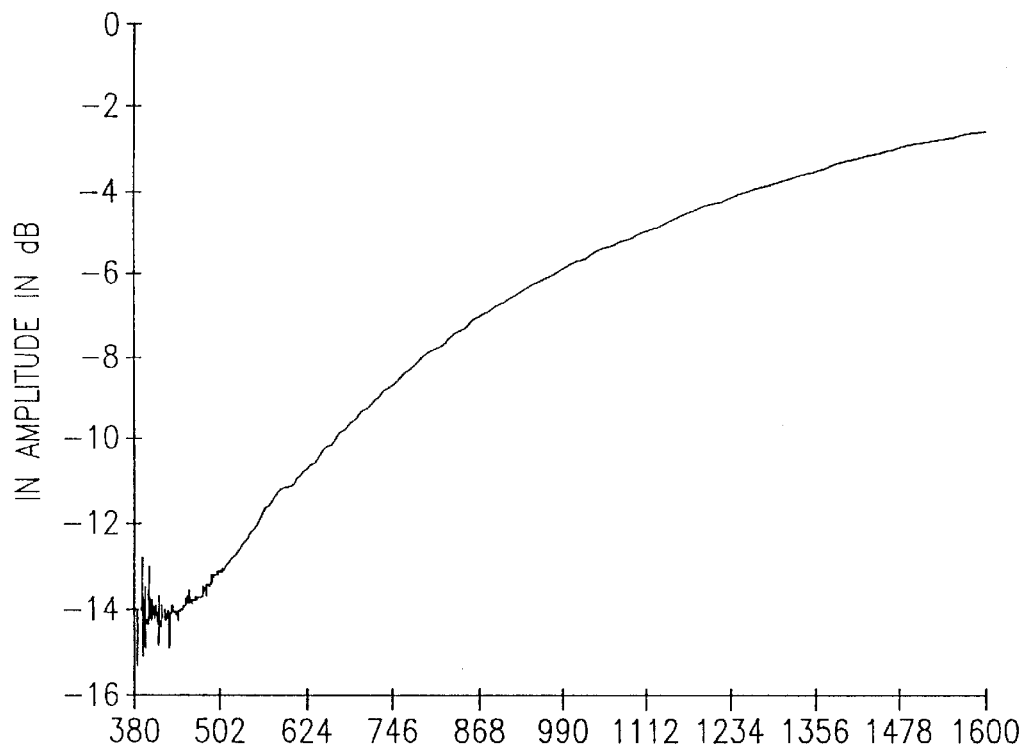
FIG. 4 illustrates the normalized transmission spectrum for a preform of the present invention which includes a particulate coating of optically active carbon.
Figure 5:
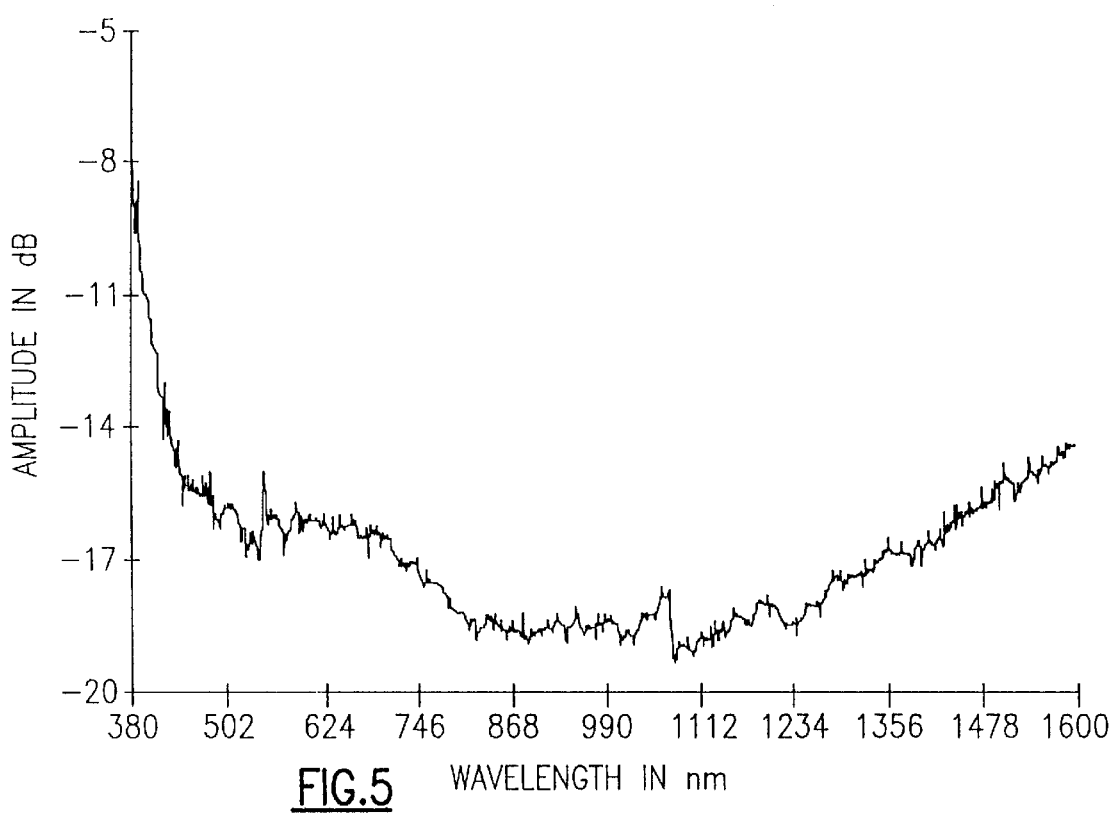
FIG. 5 illustrates the normalized transmission spectrum for a fiber pulled from the preform of FIG. 4.

In one application, a candle flame is used to coat a Pyrex rod, having a 0.1 cm outside diameter, with inert particles of carbon black which are a few nanometers in diameter. The rod is rotated about its longitudinal axis at about 5 rpm's and a paraffin candle held about 1½ inches below the rod for about 30 seconds. The candle is also traversed along the length of the rod to insure an even deposition of carbon black over the surface of the rod. The rod is then inserted into a glass tube that is closed at one end. The glass tube has a 3 mm outside diameter, and a 1.8 mm inside diameter. The tube is then evacuated to $10^{-7}$ Torr., heated at about 250° C. for two hours, and sealed at the vacuum pump end to form a closed ampoule. The ampoule is collapsed under pressure at about 650° C., and two additional Pyrex tubes are sequentially collapsed onto the collapsed ampoule to form the final preform. The fibers are then smoothly drawn from this preform, and have a homogeneous interfacial layer of carbon black. In one experiment, the fibers drawn had a core diameter of 25 $\mu$m, an outside diameter of 200 $\mu$m, and a length of 60 mm. As shown in FIG. 4 the normalized transmission spectrum of the resulting carbon nano particle cylinder preform exhibits a large absorption in the visible and UV since the fiber only guides the light where carbon nano particle cylinder interacts with the light in the UV band. FIG. 5 illustrates the normalized transmission spectrum for the carbon nano particle cylindrical fiber which shows a large transmission in the UV.

Fibers with a poled magnetic nano-particle cylinder surrounding the core can be used as the Faraday rotators in optical isolators. The technique of using nano-particles facilitates the use of high magnetic moment ferrite materials in the cylinder that surrounds the core. Such fibers will produce the required 45° rotation of the polarization for isolator application in a relatively short, 10 to 25 mm long, section of fiber.

The coating used to form the film surrounding the core can be a particulate magnetic material such as ferro magnetic ferrites Ba $Fe_{12}$ $O_{19}$ or metal and alloys. This fabrication technique results in fibers that can be used as Faraday rotators. A polarizing fiber can be constructed by using a particulate metal or alloy film. When the Faraday rotator fiber and the polarizing fiber are used in conjunction, an isolator is formed. The magnetic material in the fiber is polarized by performing the fiber pulling process in a magnetic field produced by a current carrying coil surrounding the preform and fiber below the fiber pulling heater. The magnetic material is heated to a temperature above its Curie temperature during the fiber pulling process. The fiber cools to a temperature below its Curie temperature while still in the magnetic field produced by the coil.

Another useful fiber configuration are fibers with two cores. The preforms for the two coated core fibers are fabricated as follows:

In one embodiment two individual preforms are constructed. Each preform consists of two 7440 Pyrex glass tubes that are successively collapsed onto a type 3320 2.1 mm diameter glass rod. This forms two 6.3 mm diameter preforms. The preforms are mounted next to each other on a wooden block . The wood block is clamped to the sliding platform of a glass cutter. Two glass cutting wheels forming a dado cutter are mounted on the shaft of the glass cutter. The preform and wood support are moved into the path of the dado cutter. The stacked glass cutting wheels . cut a dado between the two preforms. The resulting flat surface of each preform can be polished if necessary. The flat surfaces of the two "D" shaped preforms are coated with a suspension of type 7440 glass powder in an organic binder. The flat surfaces of the "D" shaped preform are pressed together and heated This fuses the two "D" shaped preforms into a single two core preform. A fiber is than drawn from this preform. The spacing between cores can readily be adjusted in the dado cutting process. An "Isolator" can be fabricated by surrounding both cores with a poled non absorbing magnetic material.

Figure 6:
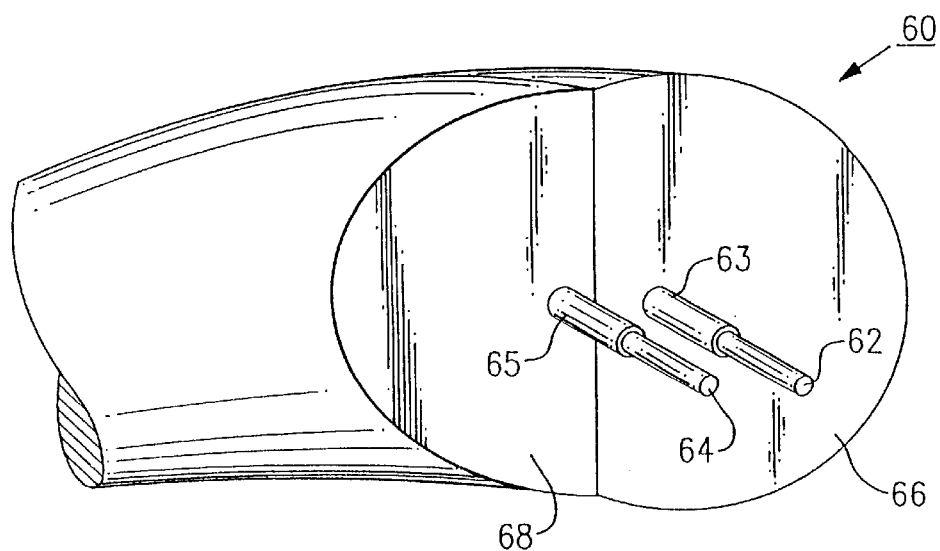
FIG. 6 is a perspective view of a dual fiber made in accordance with the present invention.

A perspective view of the resulting fiber 60 is illustrated in FIG. 6 in which the dual cores 62 and 64 are surrounded by their respective outer claddings 66 and 68, and optically active materials 63 and 65, respectively. This structure can function as an isolator when the particulate layer is magnetic.

There are many other applications of nano-particle fibers such as stress sensors. Flexing of the fibers can slightly change the local density of the nano-particles, and thus greatly effect the optical properties of the fiber. The are inexpensive to fabricate since a very large number of magnetic fiber sections can be made from a single preform.

While the present invention has been particularly shown and described with reference to the preferred mode as illustrated in the drawing, it will be understood by one skilled in the art that various changes in detail may be effected therein without departing from the spirit and scope of the invention as defined by the claims. Accordingly, the drawing and description are to be regarded as illustrative in nature, and not as restrictive.

What is claimed is:

1. A method of forming an optical fiber from a preform having a glass core surrounded by an outer glass cladding with a coating of a particulate optically active material between said core and cladding, said method comprising:

(a) providing preform having a glass core having a viscosity which lies within a given preselected temperature range with a particulate coating of an optically active material over the surface of said core with said coating material having flow properties which is equal to or less than the viscosity of said glass core; and a glass cladding over said coated layer, with said glass having a similar viscosity which overlaps the viscosity of the glass core material and thermal coefficient of expansion compatible with that of the core; and (b) drawing a fiber from the preform of (a).

2. The method of claim 1 is in which the optically active material is an inorganic material selected from the group consisting of a metal, metal alloy, ferrite, magnetic material and a semiconductor.

3. The method of claim 1 in which the particulate material is carbon.

4. The method of claim 1 in which the particulate material is magnetic.

5. The method of claim 1 in which the particulate material is a semiconductor.

6. The product formed by the process of claim 1.

7. An optical fiber having a glass core surrounded by an outer glass cladding with a substantially uniform coating of a particulate optically active material between said core and cladding with said glass core having a viscosity which lies within a given preselected temperature range with a particulate coating of an optically active material over the surface of said core with said coating material having flow properties which are equal to or less than the viscosity of said glass core; and a glass cladding over said coated layer, with said glass having a similar viscosity which overlaps the viscosity of the glass core material and thermal coefficient of expansion compatible with that of the core.

8. The fiber of claim 7 in which the optically active material is an inorganic material selected from the group consisting of a metal, metal alloy, ferrite, magnetic material and a semiconductor.

9. The fiber of claim 7 in which the particulate material is carbon.

10. The fiber of claim 7 in which the particulate material is magnetic.

11. The fiber of claim 7 in which the particulate material is a semiconductor.

* * * * *